Figure 1:
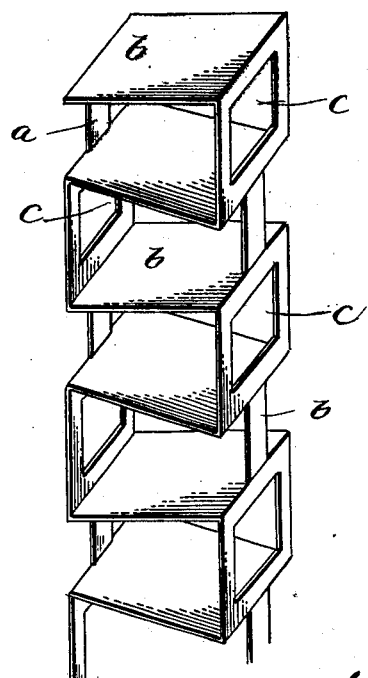
Figure 2:
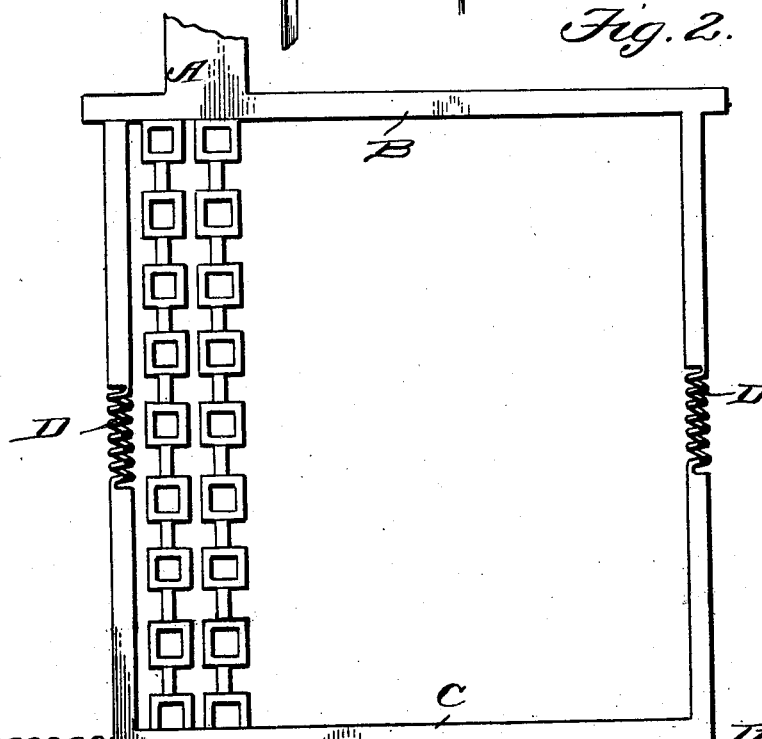
Figure 3:
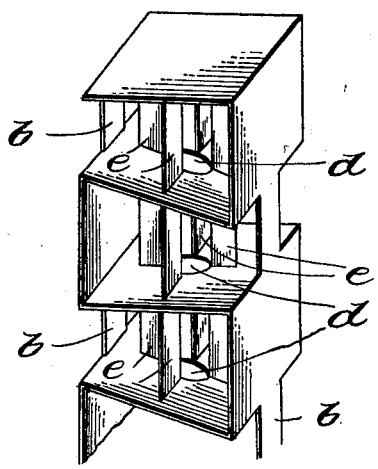
Figure 4:
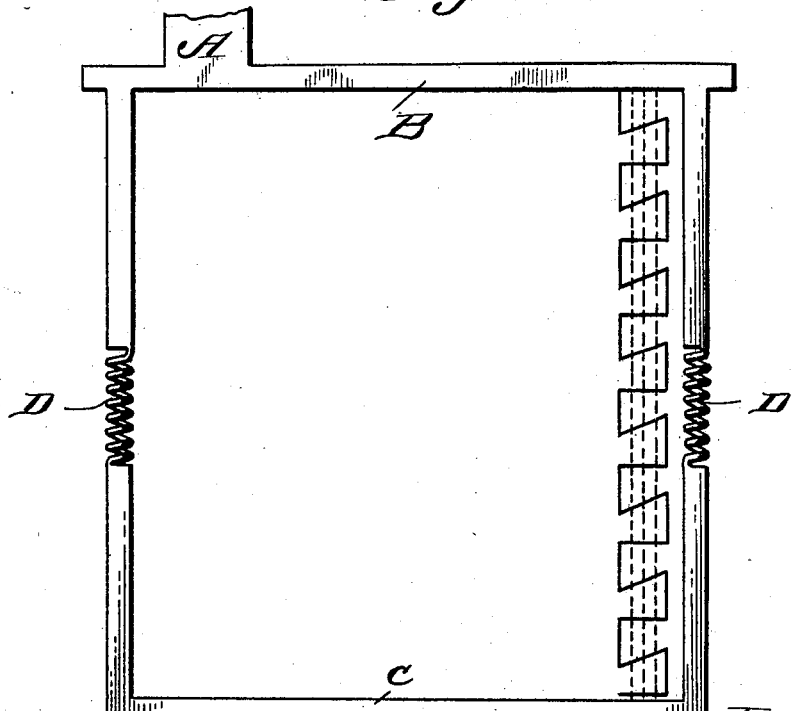

No. 678,133. Patented July 9, 1901.
J. MYERS.
ELECTRODE FOR SECONDARY OR STORAGE BATTERIES.
(Application filed Feb. 25, 1901.)
(No Model.) 2 Sheets—Sheet 1.

Witnesses: Inventor
Jacob Myers
By James L. Norris
Atty

No. 678,133. Patented July 9, 1901.
J. MYERS.
ELECTRODE FOR SECONDARY OR STORAGE BATTERIES.
(Application filed Feb. 25, 1901.)
(No Model.) 2 Sheets—Sheet 2.

Witnesses: Inventor
Jacob Myers
By James L. Norris
Atty

UNITED STATES PATENT OFFICE.

JACOB MŸERS, OF HOORN, NETHERLANDS.

ELECTRODE FOR SECONDARY OR STORAGE BATTERIES.

SPECIFICATION forming part of Letters Patent No. 678,133, dated July 9, 1901.

Application filed February 25, 1901. Serial No. 48,751. (No model.)

*To all whom it may concern:*

Be it known that I, JACOB MŸERS, teacher, a subject of Her Majesty the Queen of the Netherlands, residing at 11 Ramen, Hoorn, in the Province of North Holland, Netherlands, have invented certain new and useful Improvements in Electrodes for Secondary or Storage Batteries, of which the following is a specification.

My invention relates to certain improvements in electrodes for secondary or storage electric batteries, and has for its object to enlarge the surface of the active material in the conductor, so as to render it more exposed to the action of the sulfuric acid, to establish sufficient coherence between the active material and the conductor, and more particularly to prevent the positive electrode from bending or getting crooked.

In the accompanying two sheets of drawings, Figure I is an elevation in perspective of a pillar for a positive electrode according to my invention. Fig. II is an elevation of such positive electrode with a couple of pillars according to Fig. I affixed thereto. Fig. III is an elevation in perspective of a pillar for a negative electrode according to my invention, and Fig. IV is an elevation of such negative electrode with a couple of pillars according to Fig. III affixed thereto.

The pillars according to Fig. I for the positive electrodes are obtained by bending a strip of pure lead or of any other suitable conducting material, so as to form pillars containing swallow-tailed or rectangular cells $a$, having bottom and side walls, for the active material, and soldering together on two opposite sides of the pillar the vertical walls of said cells by means of a narrow strip $b$, of pure lead. Square or circular holes $c$ or of any other suitable form are provided at equal distances in the strips, so as to form an aperture in the side wall of each cell. I preferably give the strips a thickness of one millimeter at the utmost. The pillars may as well be cast in the aforesaid shape.

The pillars according to Fig. III for the negative electrodes are obtained by casting. In those pillars the side wall of each cell $a$ is not provided with an aperture $c$, and the strips $b$, connecting on two opposite sides of the pillar the vertical wall of two adjoining cells, are not soldered, but cast together with the cells themselves. The walls separating two adjoining cells are provided with a circular hole $d$, and those walls forming the bottom and top wall of each cell are connected by several narrow strips $e$, arranged around the circumference of the apertures $d$.

In order to form an electrode from one of the described two sorts of pillars, a certain number—say ten—are soldered to a frame of conducting material. Such frame consists of two semisquares B and C, Figs. II and IV, the uppermost semisquare B being provided with a terminal strip A. Instead of using semisquares for building up the electrodes two horizontal bars may be used as well, the strip A being soldered to the uppermost one of same; but this construction is only advantageous for electrodes measuring not above four inches high. Instead of casting the pillars and the frames separately and soldering them subsequently together both may be cast as well together in one single mold, and I even prefer doing so. The bending or getting crooked of the positive electrodes is caused by the expansion of the active material. In order to allow for this expansion, the frames are made out of two semisquares B and C, and the electrodes are arranged in the storage battery so as to allow a free downward extension.

In using electrodes measuring in height above four inches in order to increase their stiffness I prefer to connect the semisquares B and C by a spirally-wound wire D, Figs. II and IV, of conducting or non-conducting flexible material, so as to sufficiently allow for the downward extension of the pillars.

Having now particularly described and ascertained the nature of my said invention and in what manner the same is to be performed, I declare that what I claim is—

1. A positive electrode for secondary batteries comprising a metallic strip shaped to form a succession of cells open on each side and alternately open at one end, the open end of each cell being connected by a narrow strip of conducting material, substantially as described.

2. A positive electrode for secondary batteries comprising a metallic strip shaped to form a succession of cells open on each side and alternately open at one end, the open end of each cell being connected by a narrow strip of conducting material and one of the walls of each cell having an aperture formed therein, substantially as described.

3. An electrode for secondary batteries comprising a metallic strip shaped to form a succession of cells open on each side and alternately open at one end, the open end of each cell being connected by a narrow strip of conducting material, the walls separating the cells being provided with registering apertures and connected together by narrow strips of conducting material arranged about said apertures, substantially as described.

4. An electrode for secondary batteries comprising a metallic strip shaped to form a succession of wedge-shaped cells each open on the sides and at its smaller end, the open end of each cell being connected by a narrow strip of conducting material, the cells being so disposed that their open ends alternate, substantially as described.

In testimony whereof I have hereunto set my hand in presence of two subscribing witnesses.

JACOB MŸERS.

Witnesses:
THOMAS HERMANUS VERHAVE,
AUGUST SIEGFRIED DOCEN.